United States Patent [19]
Schenck

[11] Patent Number: 5,709,401
[45] Date of Patent: Jan. 20, 1998

[54] AIR BAG ATTACHMENT TO MODULE

[75] Inventor: David Patrick Schenck, Miamisburg, Ohio

[73] Assignee: General Motors Corporation, Detroit, Mich.

[21] Appl. No.: 548,763

[22] Filed: Oct. 26, 1995

[51] Int. Cl.$^6$ ............................................. B60R 21/16
[52] U.S. Cl. ................................. 280/728.2; 280/731
[58] Field of Search ........................... 280/728.2, 731, 280/732, 773.1

[56] References Cited

U.S. PATENT DOCUMENTS

| | | | |
|---|---|---|---|
| 4,964,654 | 10/1990 | Bishop et al. | 280/728.2 |
| 4,988,119 | 1/1991 | Hartmeyer | 280/728.2 |
| 5,074,584 | 12/1991 | Jarboe | 280/728.2 |
| 5,131,677 | 7/1992 | Horiuchi et al. | 280/731 |
| 5,201,541 | 4/1993 | Jones et al. | 280/731 |
| 5,205,584 | 4/1993 | Honda | 280/743.2 |
| 5,263,738 | 11/1993 | Oda et al. | 280/728.2 |
| 5,308,109 | 5/1994 | Igawa | 280/728.1 |
| 5,308,110 | 5/1994 | Kokeguchi | 280/728.2 |
| 5,356,174 | 10/1994 | Rhein et al. | 280/728.2 |
| 5,582,423 | 12/1996 | Rion et al. | 280/728.2 |

*Primary Examiner*—Kenneth R. Rice
*Attorney, Agent, or Firm*—Kathryn A. Marra

[57] ABSTRACT

An air bag module has a base structure including a plurality of hook portions. The module further includes an inflator for discharging inflator gas, and the inflator is coupled to the base structure. The module also includes an air bag made of flexible fabric air bag material. The flexible fabric air bag material of the air bag includes a plurality of air bag apertures therethrough. The hook portions of the base structure extend through the air bag apertures such that the air bag is captured on the hook portions. Upon air bag deployment, the air bag is securely anchored to the base structure by engagement of the air bag with the hook portions of the base structure. Preferably, the air bag includes a mouth portion having an air bag opening therein through which inflator gas is received. Preferably, the air bag apertures are located on the mouth portion of the air bag and the air bag opening is sized larger than the base structure so that the base structure is positioned substantially within the air bag opening.

18 Claims, 2 Drawing Sheets

AIR BAG ATTACHMENT TO MODULE

This invention relates to a vehicle air bag module, and more particularly to an air bag module having an improved structure and method for attaching the air bag to the module.

BACKGROUND OF INVENTION

It is well known in motor vehicles to provide an air bag module mounted to a vehicle steering wheel. A typical driver's side air bag module includes a base plate mounted to a hub of the steering wheel and a generally circular inflator mounted to the base plate by fasteners. The module also includes an air bag having an air bag opening for receiving discharging inflator gas therein to inflate the air bag upon the occurrence of certain predetermined vehicle conditions. The air bag includes a mouth portion surrounding the air bag opening. An air bag retainer which is typically an apertured metal plate or other structural component is attached to the mouth portion of the air bag to strengthen the mouth portion for attachment to the module. The air bag retainer, air bag, and inflator are each attached to the base plate by one or more sets of fasteners. The module typically also includes an outer cover attached to the base plate which overlies the other module components and includes weakened portions that allow the cover to open during air bag inflation. It is known in the prior art that the cover may include downwardly extending apertured fingers which are aligned for mating with metal tabs or hooks on the base plate which are then bent into place to hold the outer edges of the cover during air bag inflation.

It is also well known in motor vehicles to provide a passenger side air bag module which includes a housing for holding an inflator and an air bag therein prior to deployment. The passenger side module is typically mounted beneath an instrument panel opening which is covered by a hinged cover door. During air bag deployment, the inflator generates gas to inflate the air bag and the cover door is opened by the deploying air bag. The prior art teaches providing a structural air bag retainer such as metal rods, or a generally rectangular metal or plastic retainer which is attached to the mouth portion of the air bag and then fastened to the housing by a plurality of fasteners.

In both driver and passenger side modules, it is also known to eliminate the typical air bag opening and instead wrap the air bag around the inflator by inserting the inflator through a small hole in the side of the air bag. Many of these arrangements still require an air bag retainer to space the air bag from the inflator or heat resistant material must be included in the air bag to withstand the inflator heat during discharge. Also, the arrangement has the disadvantage of coupling the air bag and inflator to each other which may not be convenient in the assembly process.

These prior art air bag modules have the shortcoming of requiring a structural metal or plastic air bag retainer to attach the mouth portion surrounding the air bag opening to the base structure of the module, such as the base plate or housing. The retainer is either attached to the mouth portion of the air bag or mounted adjacent the mouth portion of the air bag such that the mouth portion is trapped between two structural components. In addition, prior art modules also have the shortcoming of requiring one or more sets of fasteners to attach the air bag to the air bag retainer and also to attach the air bag retainer and air bag to the base structure of the module. The use of either an air bag retainer or fasteners or both to attach the air bag to the base structure of the module adds time, weight, and cost to the manufacturing and assembly of the module. However, the prior art has recognized that the air bag retainer and fasteners are necessary components when the air bag has an air bag opening with a mouth portion attached to the base structure. The air bag retainer and fasteners are required so that the fabric air bag material of the mouth portion is sufficiently reinforced and anchored so that the air bag does not tear or release from the base structure of the module during air bag deployment.

SUMMARY OF THE INVENTION

This invention solves the shortcomings of the prior art by providing an air bag module which completely eliminates any type of structural air bag retainer and additional fasteners, such as rivets or bolts. Instead, the flexible fabric air bag material is attached directly to the base structure of the module to which the inflator is also attached. Advantageously, the mass and cost of the module are reduced and the module is easier to assemble and manufacture. Advantageously, the fasteners associated with attachment of the air bag to the air bag retainer and the air bag retainer to the base structure are also eliminated. Advantageously, the flexible fabric air bag material alone provides sufficient support and reinforcement to the mouth portion of the air bag, thus reducing the mass of the module and eliminating complex retainers and fasteners. Also advantageously, the mouth portion of the air bag is spaced apart from the inflator so that the effects on the air bag of inflator heat during discharge are minimized.

These advantages are accomplished in the present invention by providing an air bag module having a base structure including a plurality of hook portions. The module further includes an inflator for discharging inflator gas, and the inflator is coupled to the base structure. The module also includes an air bag made of flexible fabric air bag material. The flexible fabric air bag material of the air bag includes a plurality of air bag apertures therethrough. The hook portions of the base structure extend through the air bag apertures such that the air bag is captured on the hook portions. Upon air bag deployment, the air bag is securely anchored to the base structure by engagement of the air bag with the hook portions of the base structure. Preferably, the air bag includes a mouth portion having an air bag opening therein through which inflator gas is received. Preferably, the air bag apertures are located on the mouth portion of the air bag and the air bag opening is sized larger than the base structure so that the base structure is positioned substantially within the air bag opening.

In another preferred form of the invention, the base structure has outer edges and the air bag opening is sized for extending around the outer edges of the base structure. In accordance with another preferred aspect of this invention, the flexible fabric air bag material of the air bag at the mouth portion is folded onto itself to form a least two layers of flexible fabric air bag material and the air bag apertures extend through the layers of fabric air bag material. In addition, at least one extra layer of flexible fabric air bag material may be sewn to the mouth portion of the air bag and the air bag apertures extend through the air bag and the extra layer of flexible fabric air bag material.

In accordance with yet another aspect of the preferred invention, the mouth portion of the air bag is spaced apart from the inflator to minimize the effects of inflator heat during discharge. Preferably, the hook portions are adapted to be crimped around the air bag apertures to securely hold the mouth portion of the air bag in position relative the base structure.

According to another preferred form of the invention, the air bag is attached to the module by providing a base structure including a plurality of hook portions; attaching an inflator for generating inflator gas to the base structure; providing an air bag made of a flexible fabric air bag material; providing air bag apertures through the flexible fabric air bag material; and hooking the air bag apertures around the hooks of the base structure for engagement therewith. The hook portions are preferably crimped around the air bag apertures.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
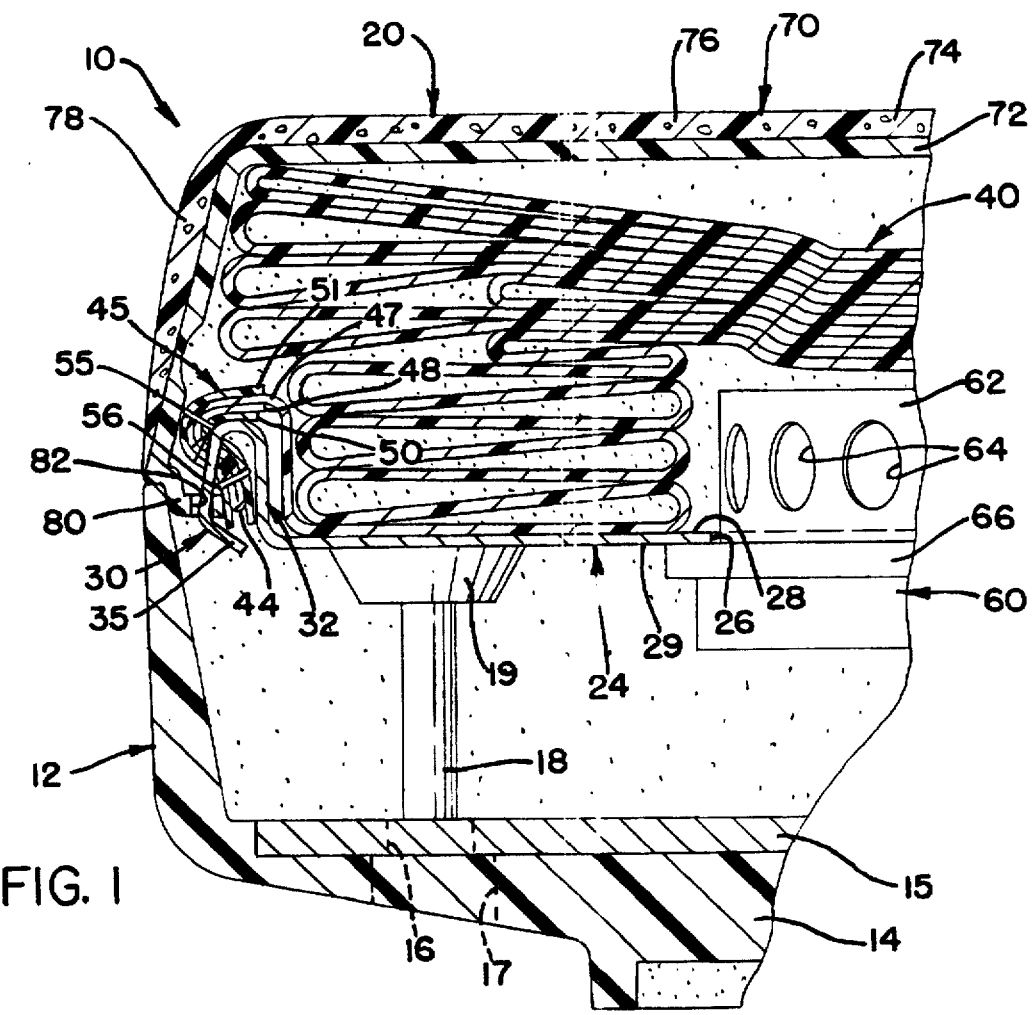
FIG. 1 shows a sectional view of a steering wheel assembly including a driver's side air bag module in the assembled condition with the steering wheel assembly partially-broken-away.

Referring to FIG. 1, a vehicle steering wheel assembly 10 includes a steering wheel 12 and an air bag module 20 mounted on a hub portion 14 of the steering wheel 12 which is made of molded material. The steering wheel 12 includes spokes and a rim portion which are not shown and are conventional. A generally rectangular-shaped support plate 15 is molded into an upper wall of the hub portion 14. The support plate 15 preferably includes support plate openings 16 at each corner aligned with respective hub openings 17 in the hub portion 14.

The driver's side air bag module is generally designated as 20. The component parts of the module 20 include a base plate 24, an air bag 40, an inflator 60, and a cover assembly 70. The air bag 40, inflator 60, and cover assembly 70 are each attached to the base plate 24 to provide the air bag module 20. The module 20 is conventionally assembled to the hub portion 14, such as by the use of internally threaded tubular members 18 which extend from embossments 19 of the base plate 24 and receive bolts (not shown) which extend upwardly through the support plate openings 16 and the hub openings 17.

The base plate 24 is preferably a metal, rectangular-shaped plate having a circular central plate opening 26 sized slightly larger than an upper outlet portion 62 of the inflator 60. The base plate 24 includes a top surface 28 and an opposite bottom surface 29 and base plate outer edges 30. Each of the outer edges 30 of the base plate 24 is provided with a respective upwardly bent flange 32 having an inner vertically upward extending leg 33 connected to an outwardly bent portion 34. The outer edges 30 of the base plate 24 further include a plurality of integrally formed, spaced apart hook portions 35 which extend generally downward from the bent portions 34 of the flanges 32 and towards the bottom surface 29 of the base plate 24.

The module 20 includes the inflator 60 for generating gas to inflate the air bag 40 when the inflator 60 receives a predetermined signal from a vehicle sensor, not shown. The inflator 60 has a generally circular shape and may be of any conventional construction for discharging gas such as through ports 64 in the upper outlet portion 62 to inflate the air bag 40. The inflator 60 includes a peripheral inflator flange 66 extending outwardly therefrom. In the assembled condition shown in FIG. 1, the inflator flange 66 underlies and is secured to the base plate 24 by a plurality of inflator fasteners, not shown, to centrally mount the inflator 60 within the plate opening 26 of the base plate 24.

The cover assembly 70 is of a generally box-like configuration and includes a box-like container substrate 72 of generally semi-rigid plastic material covered by an outer decorative cover 74 of suitable material, such as solid or foam urethane. The cover assembly 70 includes an upper wall 76 and lateral walls 78 extending downwardly from the perimeter of the upper wall 76. The cover assembly 70 includes weakened portions (not shown) on the upper wall 76 so that the cover assembly 70 breaks open during air bag deployment. The lateral walls 78 of the cover assembly 70 each include an L-shaped cover flange portion 80 shown in FIGS. 1 and 2. The cover flange portions 80 each include a plurality of slots 82 which match the spacing of respective hook portions 35 along the outer edges 30 of the base plate 24. The slots 82 are adapted to be hooked over the hook portions 35 of the base plate 24 to secure the cover assembly 70 to the module 20 as described further hereinafter.

Figure 2:
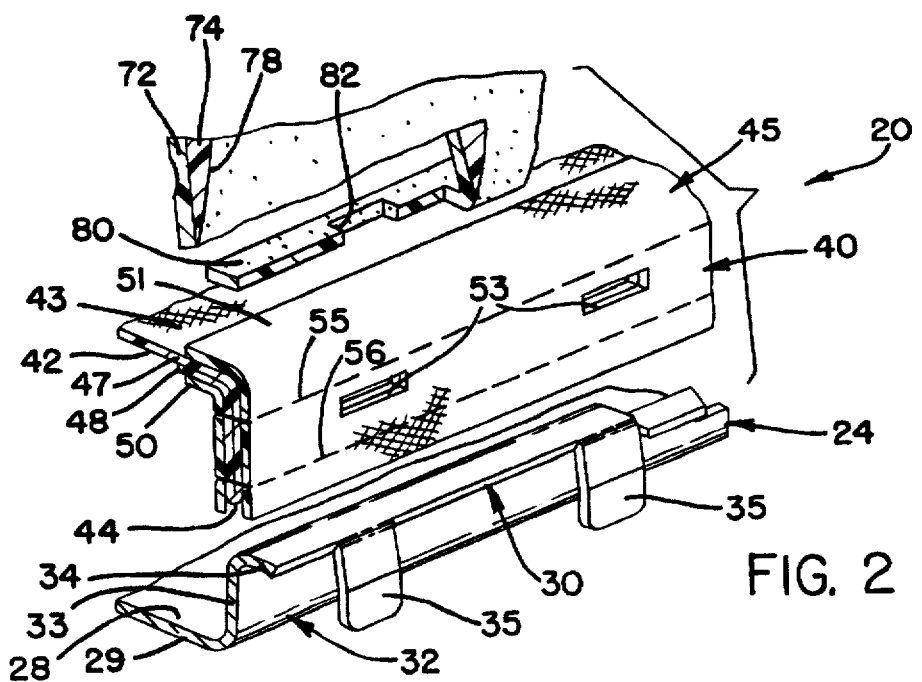
FIG. 2 shows an exploded perspective view of the air bag module of FIG. 1 and showing a base plate, an air bag, and a cover assembly partially broken away.
Figure 3:
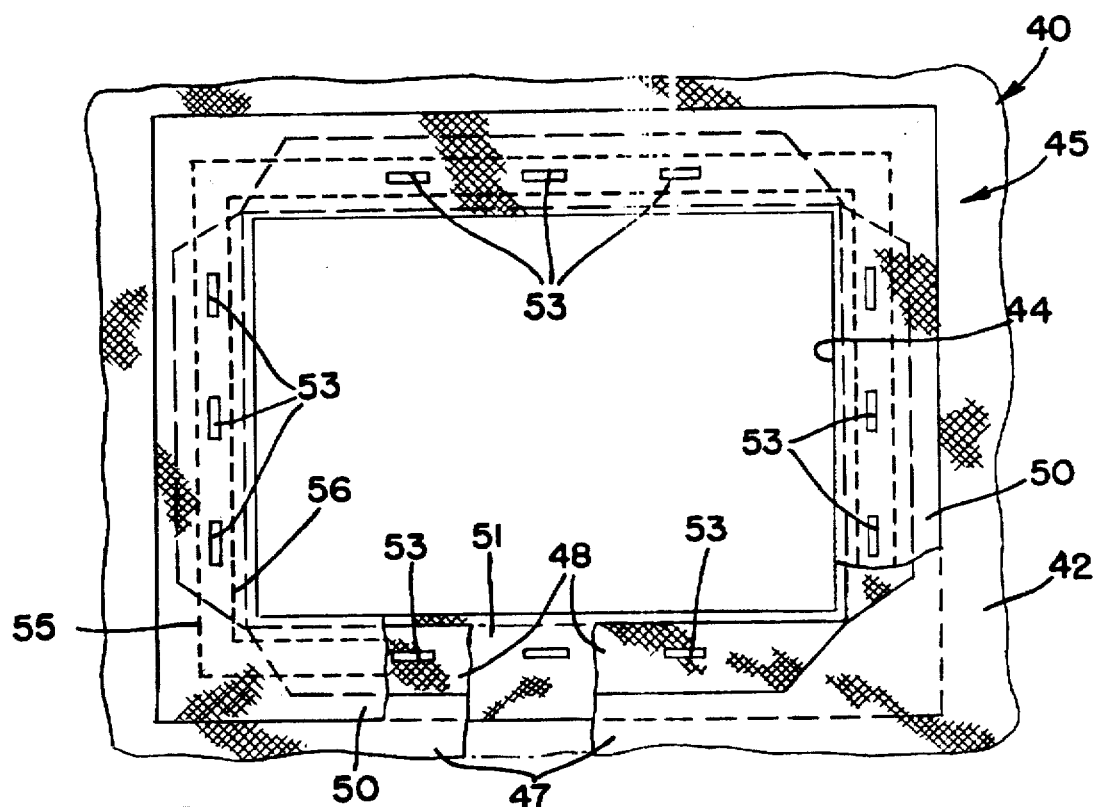
FIG. 3 shows a plan view of the air bag of FIGS. 1 and 2 with the air bag partially broken away.

Referring to FIGS. 1-3, the air bag 40 is made of a conventional flexible fabric air bag material. The air bag 40 includes an interior side 42 and an exterior side 43. The air bag 40 includes a generally rectangular air bag opening 44 surrounded by a mouth portion 45. The air bag opening 44 is sized larger than the base plate 24 so that the mouth portion 45 of the air bag 40 is large enough to extend around the outer edges 30 of the base plate 24. Also, the upper outlet portion 62 of the inflator 60 projects upwardly into the air bag opening 44 in the assembled condition. The air bag 40 is normally stored in a folded condition within the module 20.

The fabric air bag material forming the mouth portion 45 of the air bag 40 is preferably folded over onto itself to form a first layer 47 and a second layer 48 of fabric air bag material at the mouth portion 45 of the air bag 40 as best shown in FIG. 2. As best shown in FIGS. 2 and 3, an interior reinforcement layer 50 made of flexible fabric air bag material is preferably attached to the interior side 42 of the mouth portion 45 of the air bag 40. Also, an exterior reinforcement layer 51 made of fabric air bag material is preferably attached to the exterior side 43 of the mouth portion 45 of the air bag 40. Air bag apertures 53 extend through the mouth portion 45 of the air bag 40 including the first and second air bag layers 47, 48 formed by folding the mouth portion 45 back onto itself, the interior reinforcement layer 50 and the exterior reinforcement layer 51. The air bag apertures 53 are spaced apart around the mouth portion 45 of the air bag 40 and correspond for alignment with respective hook portions 35 on the base plate 24. The first and second air bag layers 47, 48 and the exterior and interior reinforcement layers 50, 51 are sewn together and held in place by a first seam 55 spaced above the air bag apertures 53 and away from the air bag opening 44 and a second seam 56 spaced below the air bag apertures 53 and towards the air bag opening 44. Both the first and second seams 55, 56 extend around the circumference of the mouth portion 45 as best shown in FIG. 3.

The air bag module 20 is preferably assembled as follows. With reference to FIG. 2, the mouth portion 45 of the air bag 40 is positioned around the outer edges 30 of the base plate 24 such that the base plate 24 is positioned substantially within the air bag opening 44. The air bag apertures 53 are each aligned with respective hook portions 35 of the base plate 24. Then, the air bag apertures 53 extending through the first and second folded air bag layers 47, 48 and the interior and exterior reinforcement layers 50, 51 are all hooked together around the respective hook portions 35 of the base plate 24. This is further enabled by the enlarged air bag opening 44 which permits the mouth portion 45 of the air bag 40 to extend around the outer edges 30 of the base plate 24 as best shown in FIG. 1. The air bag 40 may be folded either before or after attachment to the base plate 24. Next, the cover assembly 70 is preferably attached to the base plate 24 by radially expanding the lateral walls 78 of the cover assembly 70 and wrapping the cover assembly 70 around the folded air bag 40 and the base plate 24 by hooking the slots 82 in the cover flange portions 80 onto the hook portions 35 of the base plate 24. Next, the hook portions 35 are preferably crimped as shown in FIG. 1 to trap the air bag 40 and the cover assembly 70 on the hook portions 35 of the base plate 24.

Next, the inflator 60 is inserted into the module 20 from the bottom with the upper outlet portion 62 centered in the plate opening 26 of the base plate 24. The inflator flange 66 is suitably attached to the base plate 24, such as by fasteners, to complete the module 20. It is desirable to have the inflator 60 be the last component assembled to the module 20 for ease of assembly. Finally the entire module 20 is suitably mounted to the hub portion 14 of the steering wheel 12, such as by the use of the internally threaded tubular members 18 which extend from embossments 19 of the base plate 24 and receive bolts which extend upwardly through the support plate openings 16 and the hub openings 17.

In the assembled condition shown in FIG. 1, the air bag 40 and the cover assembly 70 are securely anchored to the base plate 24 of the module 20 such that the cover assembly 70 and the air bag 40 are held in position relative to the base plate 24 during the forces associated with air bag inflation. It will further be appreciated that the air bag 40 is attached directly to the base plate 24 without the use of any separate fasteners, such as rivets or bolts.

Upon actuation, the inflator 60 discharges inflator gas. The ports 64 of the inflator 60 direct the discharging inflator gas upwardly to inflate the air bag 40 which will deploy upwardly towards the upper wall 76 of the cover assembly 70. The weakened portions of the upper wall 76 permit the cover assembly 70 to open during air bag inflation. During the application of forces associated with air bag inflation, the air bag apertures 53 of the mouth portion 45 of the air bag 40 securely engage the hook portions 35 of the base plate 24 and the air bag 40 is held in position relative the base plate 24 without the use of fasteners. The air bag 40 will not release from the base plate 24 during deployment since the mouth portion 45 of the air bag 40 includes the layers 47, 48, 50, 51 of air bag material around the mouth portion 45. Advantageously, testing has shown that attachment of the fabric air bag material alone to the hook portions 35 of the base plate 24 is sufficient to prevent tearing of the air bag 40 away from the base plate 24 during air bag deployment. Thus, there is no need for a metal or plastic air bag retainer to reinforce the mouth portion 45 of the air bag 40 and no need to sandwich the air bag 40 between an air bag retainer and the base plate 24. In addition, no fasteners, such as rivets, are needed to connect the air bag 40 to an air bag retainer or to the base plate 24.

It will also be appreciated that the air bag opening 44 is sized greater than the base plate 24 such that the mouth portion 45 of the air bag 40 is radially spaced apart from the inflator 60. Advantageously, this minimizes the effects of inflator heat on the mouth portion 45 of the air bag 40 during air bag deployment. It will further be appreciated that since an air bag retainer and air bag fasteners are eliminated, the module 20 is lighter, less expensive and easier to assemble than prior modules.

It will be understood that a person skilled in the art may make modifications to the preferred embodiment shown herein within the scope and intent of the claims. Although the preferred embodiment shows a generally rectangular base plate 24 and air bag opening 44, the base plate 24 and the air bag opening 44 may be any geometric shape, such as circular, hexagonal, quadrangular or others. Although the preferred embodiment shows the reinforcement layers 50, 51 preferably made of a flexible air bag fabric material, the layers could be made of another flexible fabric material such as "NYLON", "POLYESTER" or "KEVLAR". It will further be appreciated that either none, one or more than one reinforcement layers may also be utilized depending on the strength of the fabric air bag material and the force of the discharging inflator gas. Although the preferred embodiment shows the mouth portion 45 folded over onto itself to form first and second air bag layers 47, 48, it will be appreciated that the mouth portion 45 could be folded over to form additional layers or need not be folded over at all. Although the preferred embodiment shows the cover assembly 70 conveniently hooked onto the same base plate hook portions 35 as the air bag 40, separate hook portions or fasteners could be used to attach the cover assembly 70 to the base plate 24. Although the preferred embodiment shows the hook portions 35 being crimped, it will be appreciated that the hook portions 35 need not be crimped especially if the mouth portion 45 of the air bag 40 fits taut around the base plate 24 when assembled thereto. Although the preferred embodiment is shown as used on a driver's side air bag module, it will be appreciated that this air bag attachment could be used to eliminate the air bag retainer and fasteners in other air bag modules having any base structure to which an inflator is mounted.

Figure 4:
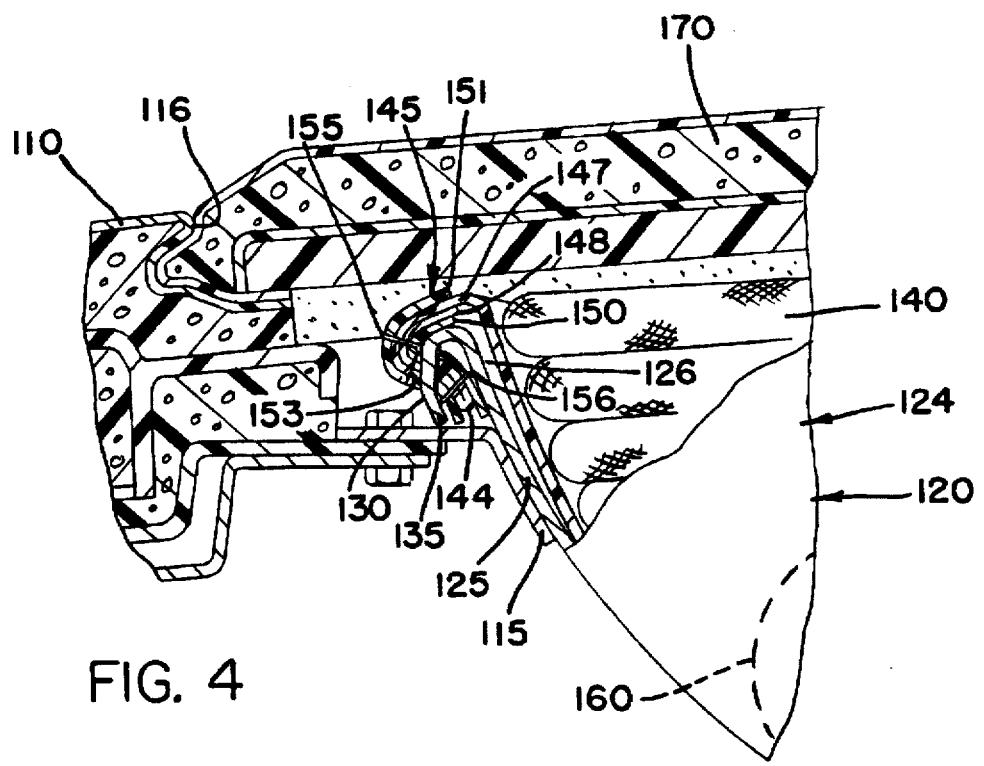
FIG. 4 shows an alternate embodiment of the invention in a passenger side air bag module.

For example, an alternate embodiment of the present invention is shown in FIG. 4 for use in a passenger side air bag module 120 having the component parts of a base structure 124 being a canister housing, an air bag 140, and an inflator 160 for discharging gas to inflate the air bag 140. The module 120 is mounted beneath a hinged cover door 170 covering an opening 116 in a vehicle instrument panel 110. The cover door 170 is forced open by the deploying air bag 140 during air bag inflation.

The base structure 124 is a metal housing canister having walls 125 defining a rectangular base structure opening 126. The base structure 124 is suitably secured beneath the instrument panel 110, such as by a bracket 115. The upper outermost edges 130 of the base structure 124 include integral downwardly projecting hook portions 135 which are spaced apart around the perimeter of the upper outermost edges 130 of the base structure 124. The inflator 160 is of a conventional construction for discharging inflator gas to inflate the air bag 140. The inflator 160 is mounted to the base structure 124 beneath the air bag 140.

The air bag 140 is made of a conventional flexible fabric air bag material. The air bag 140 includes a generally rectangular air bag opening 144 surrounded by a mouth portion 145 of the air bag 140 for attachment to the base structure 124. The air bag opening 144 is sized larger than the upper outermost edges 130 of the base structure 124 so that the mouth portion 145 of the air bag 140 fits snugly around the edges 130 of the base structure 124 and the base structure opening 126 when assembled thereto. The mouth portion 145 of the air bag 140 is preferably folded over onto itself to provide first and second layers 147, 148 of fabric air bag material around the mouth portion 145 of the air bag 140. In addition, an interior reinforcement layer 150 made of fabric air bag material and an exterior reinforcement layer 151 made of fabric air bag material are preferably attached to the mouth portion 145 of the air bag 140 by first and second seams 155, 156. The air bag 140 includes air bag apertures 153 located on the mouth portion 145 of the air bag 140 between the seams 155, 156 and extending through the first and second layers 147, 148 and the interior and exterior reinforcement layers 150, 151. The air bag apertures 153 are spaced apart around the mouth portion 145 of the air bag 140 to correspond for alignment with the hook portions 135 of the base structure 124.

The air bag 140 is attached to the base structure 124 by hooking the air bag apertures 153 over respective hook portions 135 of the base structure 124. The hook portions 135 may be crimped to further secure the air bag 140 to the base structure 124. Upon air bag deployment, the mouth portion 145 of the air bag 140 comprised of only fabric air bag material is sufficiently strong to secure the air bag 140 to the base structure 124 and to hold the air bag 140 in position relative the base structure 124 during air bag deployment. Thus, an air bag retainer and fasteners for attaching the air bag to an air bag retainer and the retainer to the base structure are eliminated to provide a lighter, less expensive, and easier to assemble passenger side module 120.

While the present invention has been described as carried out in a specific embodiment thereof, it is not intended to be limited thereby but is intended to cover the invention broadly within the scope and spirit of the claims.

What is claimed is:

1. An air bag module for a vehicle comprising:
   a base structure including a plurality of hook portions;
   an inflator for discharging inflator gas, the inflator coupled to the base structure;
   an air bag made of flexible fabric air bag material, the flexible fabric air bag material of the air bag including a plurality of air bag apertures therethrough; and
   the hook portions of the base structure extending through the air bag apertures such that the air bag is captured on the hook portions;
   whereby upon air bag deployment the air bag is securely anchored to the base structure by engagement of the air bag with the hook portions of the base structure.

2. The air bag module of claim 1 wherein the air bag includes a mouth portion having an air bag opening therein through which inflator gas is received and wherein the air bag apertures are located on the mouth portion of the air bag.

3. The air bag module of claim 2 wherein the base structure has outer edges and wherein the air bag opening is sized for extending around the outer edges of the base structure.

4. The air bag module of claim 2 wherein the flexible fabric air bag material of the air bag at the mouth portion is folded onto itself to form at least two layers of flexible fabric air bag material and wherein the air bag apertures extend through the layers of fabric air bag material.

5. The air bag module of claim 2 wherein at least one extra layer of flexible fabric air bag material is sewn to the mouth portion of the air bag and wherein the air bag apertures extend through the air bag and the extra layer of flexible fabric air bag material.

6. The air bag module of claim 2 wherein the air bag includes an interior side and an exterior side and wherein a ft and a second reinforcement layer of flexible fabric air bag material are attached to the interior and exterior sides of the air bag, respectively, at the mouth portion and wherein the air bag apertures extend through the air bag and the first and second reinforcement layers.

7. The air bag module of claim 2 wherein the air bag opening is sized larger than the base structure so that the base structure is positioned substantially within the air bag opening.

8. The air bag module of claim 2 wherein the mouth portion is spaced apart from the inflator.

9. The air bag module of claim 1 wherein the hook portions are adapted to be crimped.

10. The air bag module of claim 1 wherein the module includes a cover for covering the air bag and the inflator and wherein the cover includes a plurality of slots adapted to be hooked onto the hook portions of the base structure to anchor the cover to the base structure.

11. The air bag module of claim 1 wherein the hook portions project downwardly.

12. An air bag module for a vehicle comprising:
    a base structure having a plurality of integral downwardly projecting hook portions thereon;
    an inflator for discharging inflator gas, the inflator coupled to the base structure; and
    an air bag made of a flexible fabric air bag material, the air bag having an air bag opening surrounded by a mouth portion, the air bag opening for receiving inflator gas therethrough to inflate the air bag, the mouth portion of the air bag including a plurality of air bag apertures therethrough;
    the hook portions of the base structure extending through the air bag apertures such that the air bag is directly captured on the hook portions of the base structure;
    whereby upon air bag deployment the air bag is securely anchored to the base structure by engagement of the air bag with the hook portions.

13. The air bag module of claim 12 wherein the flexible fabric air bag material of the air bag at the mouth portion is folded onto itself to form at least two layers of flexible fabric air bag material and wherein the air bag apertures extend through the layers of fabric air bag material.

14. The air bag module of claim 12 wherein at least one extra layer of flexible fabric air bag material is sewn to the mouth portion of the air bag and wherein the air bag apertures extend through the air bag and the extra layer of flexible fabric air bag material.

15. The air bag module of claim 12 wherein the air bag opening is sized larger than the base structure so that the base structure is positioned substantially within the air bag opening.

16. The air bag module of claim 12 wherein the hook portions are adapted to be crimped.

17. A method of attaching an air bag to an air bag module, the method comprising the steps of:
    providing a base structure including a plurality of hook portions;
    attaching an inflator for generating inflator gas to the base structure;
    providing an air bag made of a flexible fabric air bag material;
    providing air bag apertures through the flexible fabric air bag material; and
    hooking the air bag apertures around the hook portions of the base structure for engagement therewith.

18. The method of claim 17 further comprising the step of: crimping the hook portions.

* * * * *